May 24, 1960 N. OETINGER 2,937,641
UPHOLSTERED MASSAGE FURNITURE
Filed Sept. 23, 1957 6 Sheets-Sheet 1
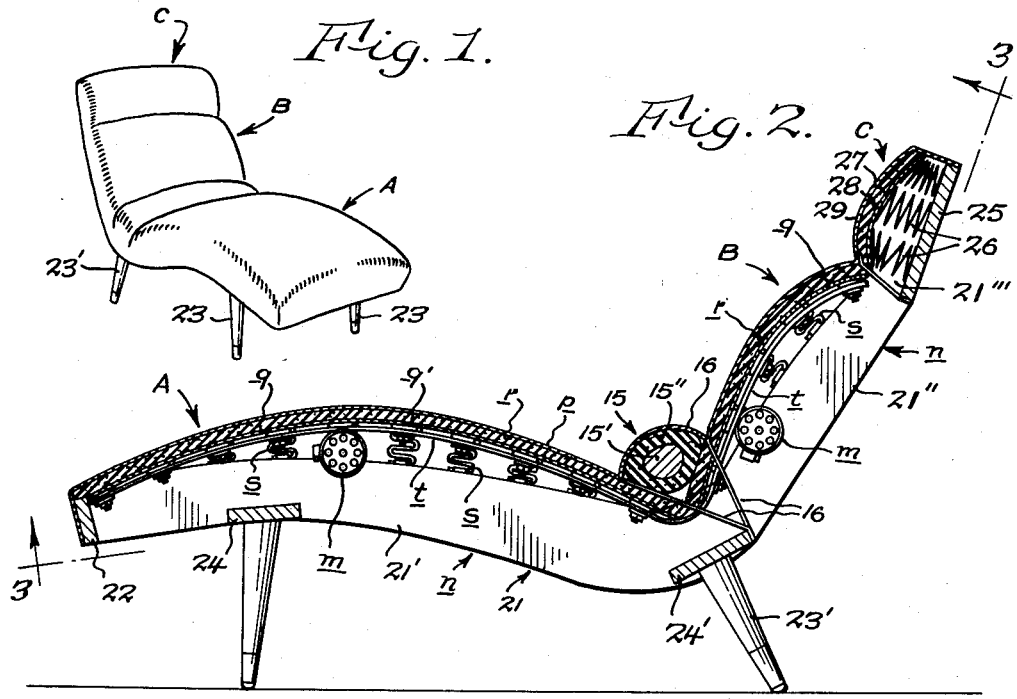
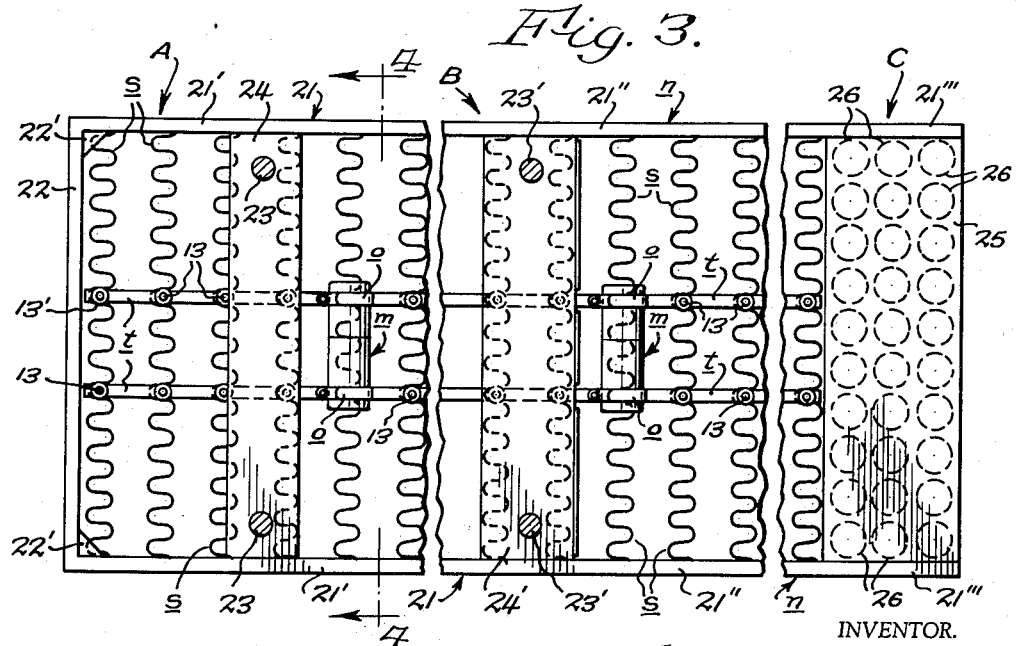
INVENTOR.
Norman Oetinger
BY
Reuben J. Carlson
Attorney.

May 24, 1960
N. OETINGER
2,937,641
UPHOLSTERED MASSAGE FURNITURE
Filed Sept. 23, 1957
6 Sheets-Sheet 2
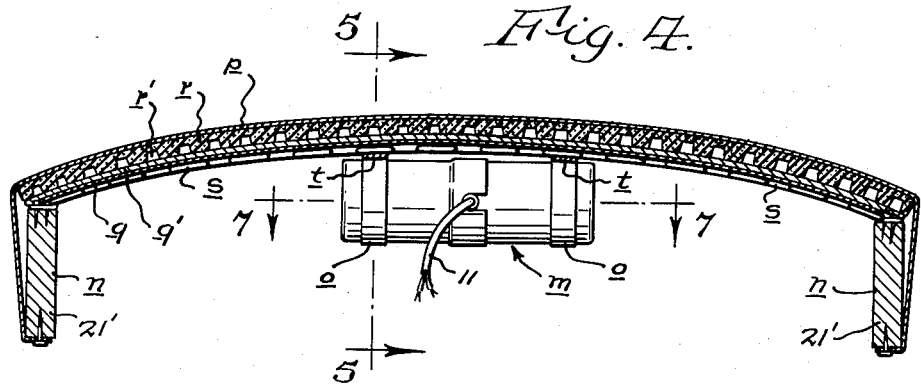
Fig. 4.
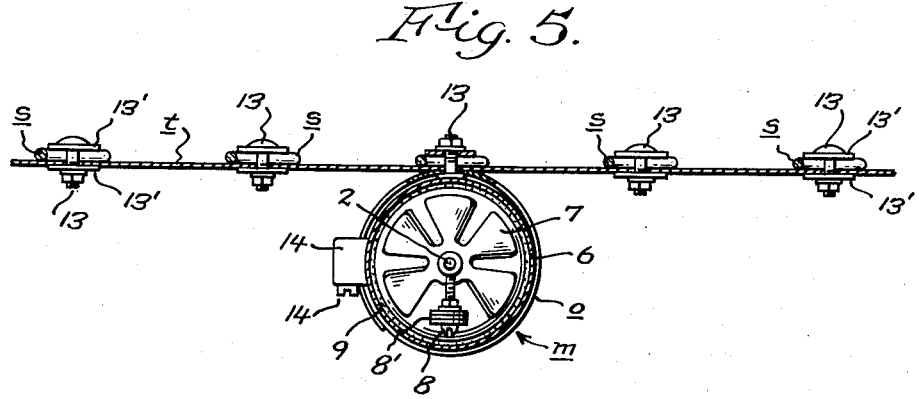
Fig. 5.
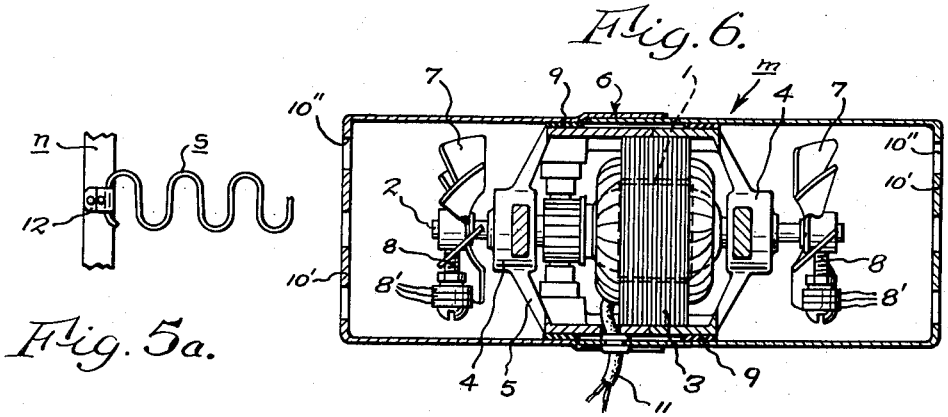
Fig. 6.
Fig. 5a.
INVENTOR.
Norman Oetinger
BY
Reuben J. Carlson
Attorney.

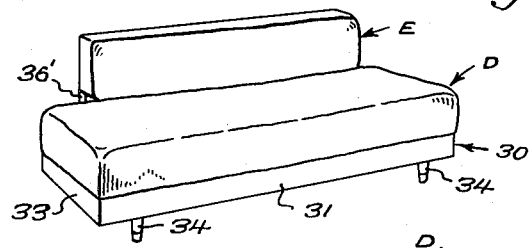
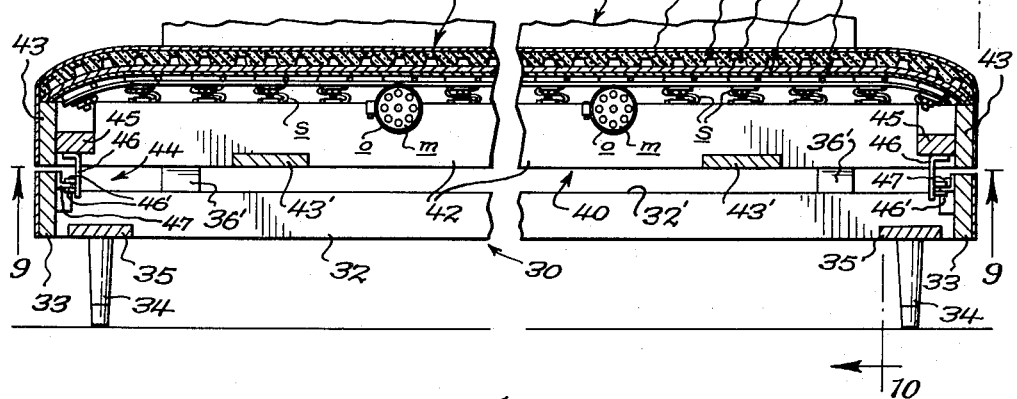
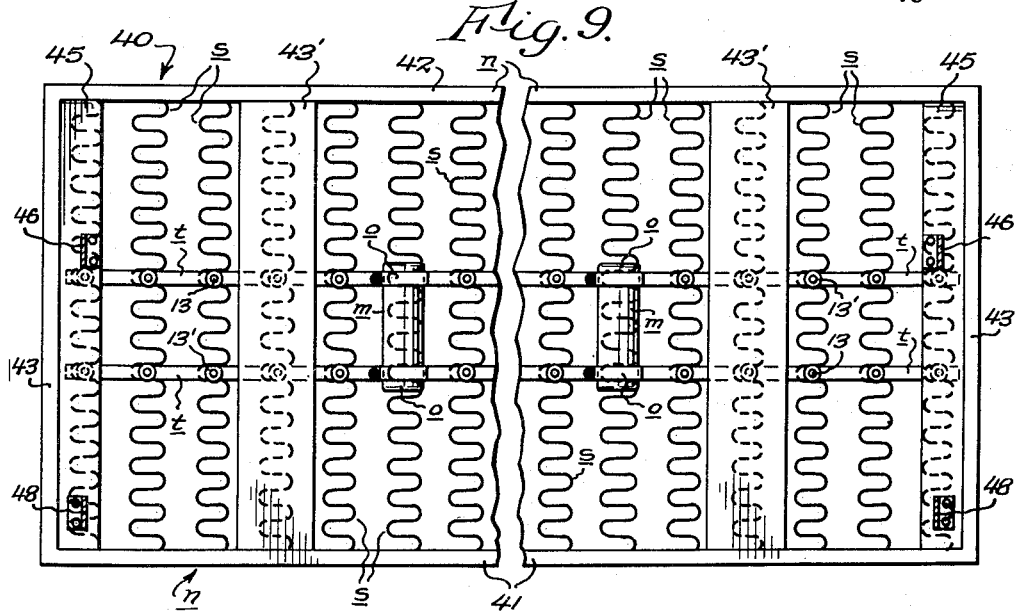

May 24, 1960
N. OETINGER
2,937,641
UPHOLSTERED MASSAGE FURNITURE
Filed Sept. 23, 1957
6 Sheets-Sheet 4
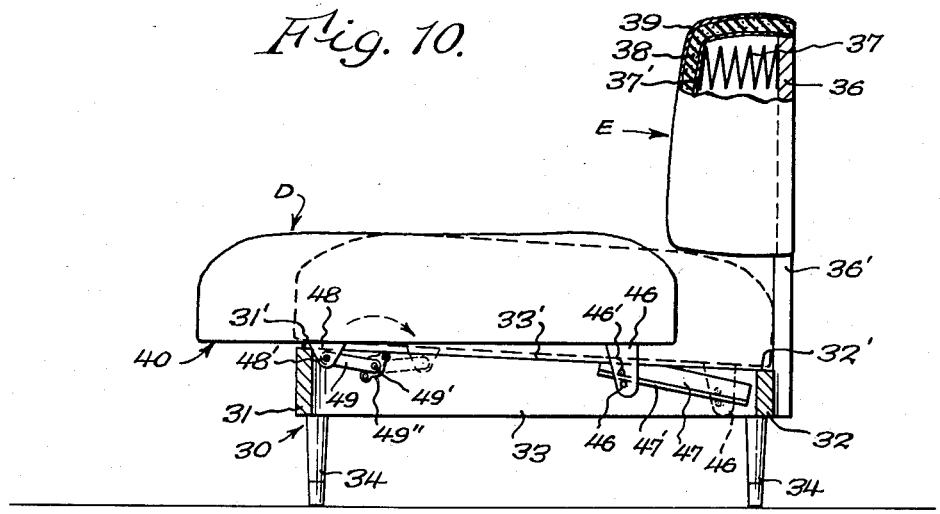
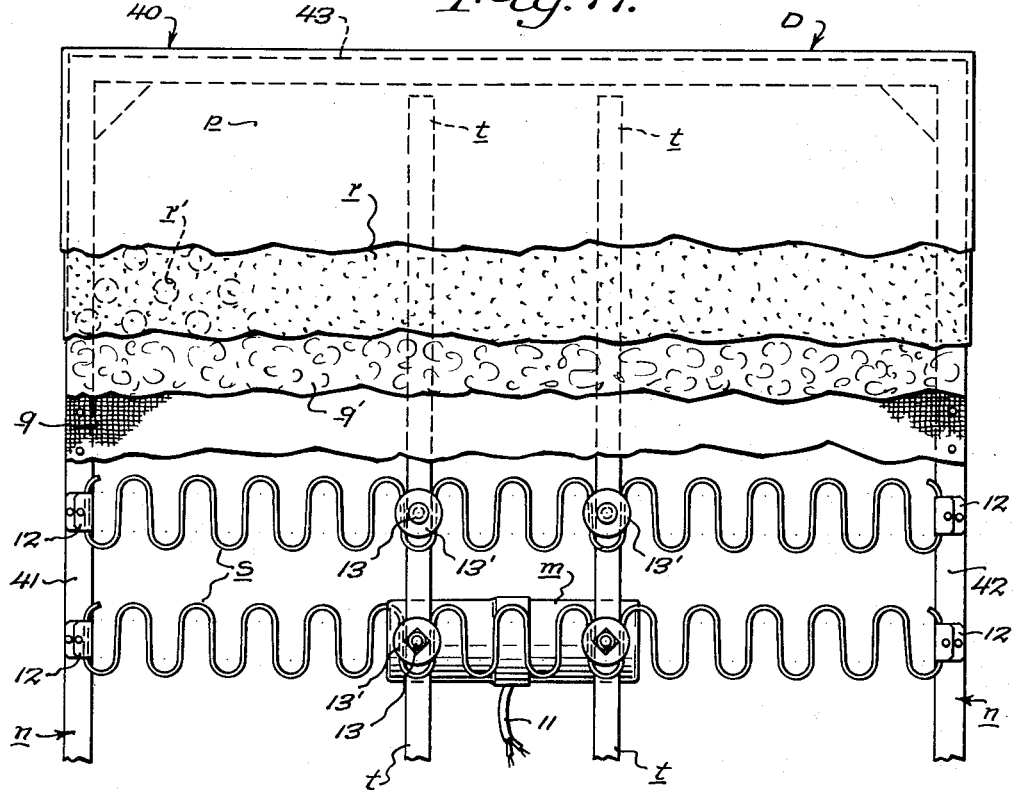
INVENTOR.
Norman Oetinger
BY
Reuben J. Carlson
Attorney.

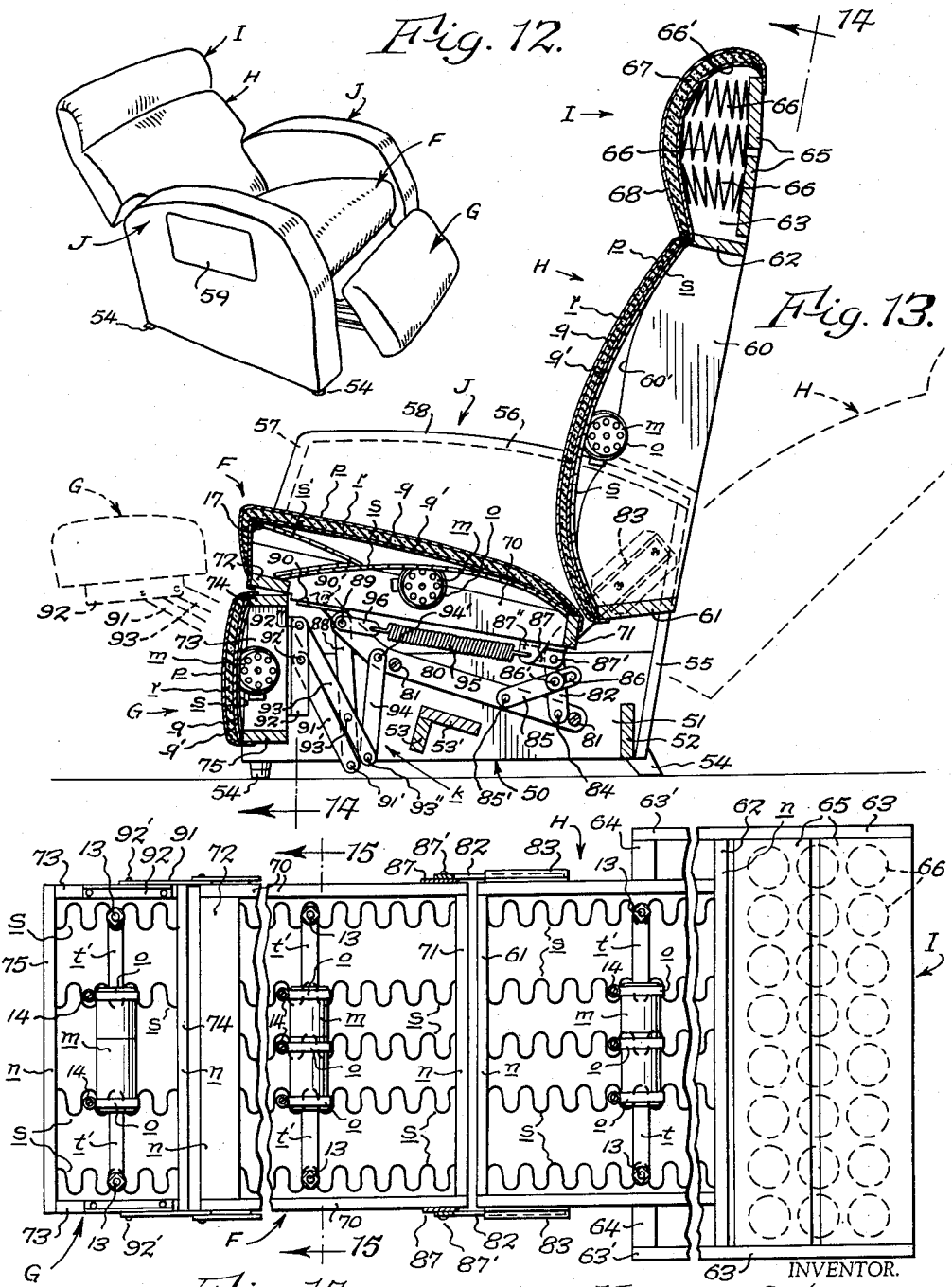

May 24, 1960  N. OETINGER  2,937,641
UPHOLSTERED MASSAGE FURNITURE
Filed Sept. 23, 1957  6 Sheets-Sheet 6
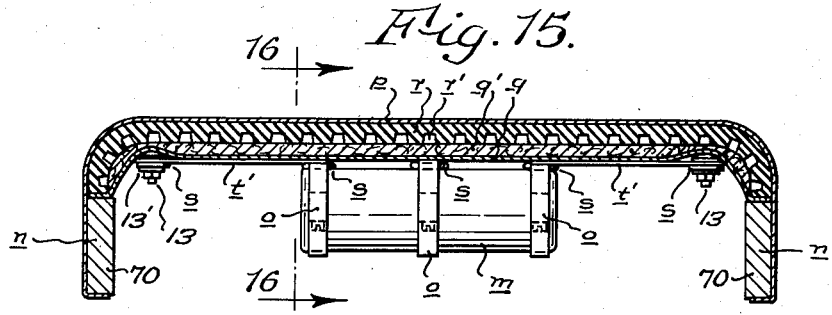
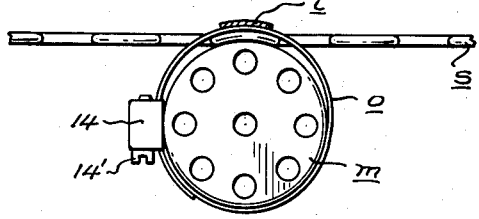
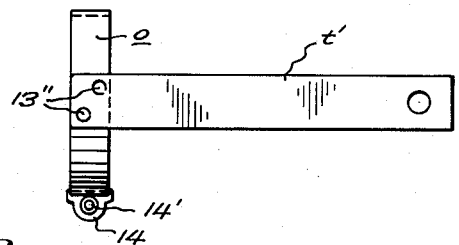
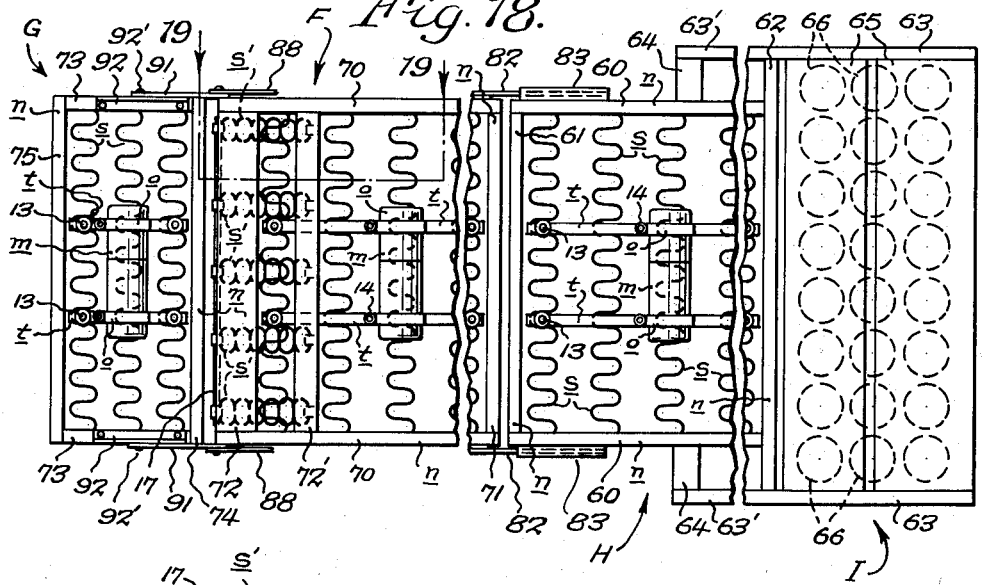
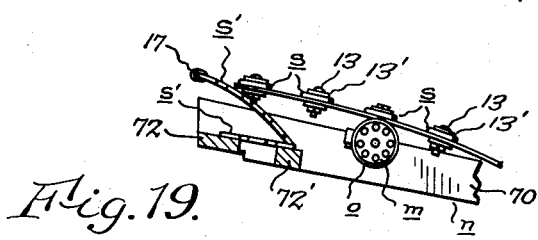
INVENTOR.
*Norman Oetinger*
BY
*Reuben J. Carlson*
Attorney United States Patent Office 2,937,641
Patented May 24, 1960

2,937,641

UPHOLSTERED MASSAGE FURNITURE

Norman Oetinger, Buffalo, N.Y., assignor to Owen K. Murphy, Adamsville, Pa.

Filed Sept. 23, 1957, Ser. No. 685,449

16 Claims. (Cl. 128—33)

This invention relates to upholstered massage furniture, and more particularly to upholstered furniture whose cushioned body supporting surfaces are designed to transmit soothing and restful massage action to those parts of the human body in contact therewith.

In accordance with this invention, the massage action is generated by gyratory motor whose rotary part has a predetermined rotary unbalance operative to deliver gyratory motion to the enclosing casing within which the gyratory motor is supported. The motor gyrated casing is operatively connected to a series of parallel extending and upwardly arching sinusoidal springs by one or more motion transmitting bands arranged and designed to transmit maximum motion to the entire series of sinusoidal springs. The ends of the sinusoidal springs are fixed to rigid frame members forming a part of the cushion framework in a manner to maintain the sinusoidal springs in upwardly arched position. The series of upwardly arching springs not only provide body supporting resiliency to the cushion, but insure maximum massage motion to the body supporting surface of the cushion.

The upwardly arching surface as formed by the series of upwardly arching sinusoidal springs, is preferably covered by a rough fabric covering such as burlap or the like. To even out the surface of the fabric covering and effectuate the desired contouring of the cushion surface, a layer of cotton or like fibre wadding is then spread over the fabric covering. A highly resilient cushioning pad of substantial thickness, and preferably formed from a highly resilient natural or synthetic rubber composition such as foam rubber latex or foam rubber plastic, is then positioned over the thinner layer of contour wadding. The highly resilient cushioning pad is snugly enclosed and moderately compressed by upholstery covering of limited stretch characteristics. The upholstery covering may be formed from upholstery fabric, or natural or synthetic upholstery material such as natural or synthetic leathers and plastic sheetings of upholstery quality. The rough fabric undercovering grips the sinusoidal springs therebelow and the superimposed cotton wadding which in turn grips the resilient foam rubber padding thereabove to insure maximum motion transmission from the sinusoidal springs to the upholstery covering which snugly embraces the resilient rubber padding. The rough fabric undercovering, and the surface forming upholstery covering, may be secured in position by tacking the marginal edges thereof to the cushion framework.

The motion transmitting band or bands to which the gyratory motor assembly is rigidly secured, are also rigidly secured to the underface and to the approximate midsection of each of the sinusoidal springs of the cushion, and extend transversely thereof. The gyratory motor assembly is positioned in the approximate center of the area covered by the sinusoidal springs, and is preferably connected to the motion transmitting bands so that the motor axis extends approximately in parallelism with the arching length of the substantially parallel sinusoidal springs, so that the entire series of sinusoidal springs have a maximum vibration stroke in a direction transverse thereto. However, good motion transmitting results can also be obtained when the axis of the gyratory motor assembly is positioned to extend in a direction substantially at right angles to the spring length, since the sinusoidal springs as upwardly arched are also capable of substantial vibration in a direction lengthwise thereof.

The body massage system of this invention delivers maximum massage action to the parts of the human body as seated or reclining against the cushioned surfaces of the cushion sections forming a part of the upholstered furniture. The gyratory motion transmitting system is so designed and constructed that the gyratory motion generated by the operating motor imparts a generally elliptical shaped path of motion to the body supporting surface of the cushion, with the major motion stroke extending lengthwise of the body supported on the cushioned surface, and with the minor motion stroke extending in a vertical direction with respect to the body supporting surface of the cushion. The elliptical path of motion thus produced results in a massage action which is soothing and relaxing, stimulates the occupant's blood circulation, relieves nervous tension, relaxes the occupant's muscles, relieves muscle soreness, and in general, relaxes the body and induces restful sleep.

The body massage system of this invention may be advantageously incorporated into the body supporting cushioning sections of various types and kinds of upholstered furniture such as chaise lounges, sofas, beds, reclining and straight back chairs, and the like. The gyratory motor and motion transmitting system, as incorporated into the body supporting cushion of upholstered furniture, is fully concealed from view, and in no way detracts from the appearance of the upholstered furniture or its use as attractive furniture pieces for the home and office.

Where the upholstered massage furniture of this invention incorporates a headrest section as well as a body massaging backrest section, the cushioning springs for the headrest section are made independent of the message action transmitting system of the backrest section, so that the occupant's head reclining on the cushioned headrest section is not subjected to direct massage action, thereby permitting the occupant to read without disturbance while the seat and back of the occupant are subjected to the desired massage action.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which Fig. 1 is a perspective view of a chaise lounge having the motor operated massage system of this invention incorporated into the upholstered seat section and backrest section thereof.

Fig. 2 is a longitudinal vertical section of the chaise lounge shown in Fig. 1 which illustrates certain details of the motor operated massage system associated with the upholstered seat and backrest sections thereof.

Fig. 3 is a fragmentary plan view of the underside of the cushioned seat section, backrest section, and headrest section of the chaise lounge as the same would appear when viewed in the direction of the arrows of line 3—3 of Fig. 2, this view showing further details of the motor operated massage system associated with the upholstered seat and backrest sections thereof.

Fig. 4 is a transverse vertical section taken through the seat section of the chaise lounge as the same would appear when viewed along line 4—4 of Fig. 3, this view showing further details of the motor operated massage system incorporated therewith.

Fig. 5 is a sectional view of the gyratory motor assembly and a part of the gyratory motion transmitting system as the same would appear when viewed along line 5—5 of Fig. 4.

Fig. 5A is a fragmentary detail showing the manner in which the sinusoidal springs which form a part of the motion transmitting system are secured to the framework of the upholstered massage cushions.

Fig. 6 is a cross section of the gyratory motor assembly as the same would appear when viewed along line 6—6 of Fig. 4.

Fig. 7 is a perspective view of another piece of upholstered massage furniture in the form of a sofa-bed having the motor operated massage system of this invention incorporated into the cushioned seat or bed section thereof.

Fig. 8 is a longitudinal vertical section showing certain details of the motor operated massage system incorporated into the cushioned seat section of the sofa-bed shown in Fig. 7.

Fig. 9 is a plan view looking upwardly at the underface of the upholstered seat section and in the direction of the arrows of line 9—9 of Fig. 8, this view showing further details of the motor operated massage system associated therewith.

Fig. 10 is an end view of the sofa-bed shown in Fig. 7, certain parts thereof being shown in section and revealing further details of the seat cushion slide-out mechanism.

Fig. 11 is a fragmentary top plan view of the seat cushion section of the sofa-bed, with various parts thereof broken away to illustrate further details of the seat cushion and motor operated massage system associated therewith.

Fig. 12 is a perspective view of a reclining chair having the motor operated massage system of this invention associated with the adjustable seat section, backrest section, and legrest section thereof.

Fig. 13 is a vertical section of the reclining chair shown in Fig. 12, this view showing certain details of the adjustable backrest section, seat section and legrest section, the motor operated massage system associated therewith, and the mechanism for manipulating the sections to and from reclining position.

Fig. 14 is an underface view of the legrest section, seat section and backrest section as the same would appear when viewed in the direction of the arrows of line 14—14 of Fig. 13, this view showing further details of the motor operated massage system associated with these sections.

Fig. 15 is a transverse vertical section taken through the cushioned seat section of the reclining massage chair as the same would appear when viewed along line 15—15 of Fig. 14, this view showing further details of the motor operated massage system associated therewith.

Fig. 16 is an end view of the gyratory motor assembly and strap means for connecting the same in motion transmitting assembly to the sinusoidal springs of the cushioned seat section.

Fig. 17 is a fragmentary detail of the strap means which may be employed to connect the gyratory motor to the sinusodial springs of the cushioned legrest section, seat section and backrest section of the massage structure shown in Fig. 14.

Fig. 18 is a plan view of the underface of the cushioned legrest section, seat section and backrest section which incorporates a modified form of sinusoidal spring and motion transmitting assembly for a reclining chair; and Fig. 19 is a fragmentary detail of the modified sinusoidal spring and motion transmitting assembly for the seat section, as the same would appear when viewed along line 19—19 of Fig. 18.

Similar reference characters refer to similar parts throughout the several views of the drawings and specification.

The upholstered massage furniture of this invention is designed to transmit maximum massage action to those parts of the human body seated on or reclining against the upholstered and cushioned surfaces of upholstered furniture. The massage action is generated by one or more gyratory motor assemblies $m$ each including a gyratory motor having a predetermined mechanical unbalance which is purposely built into the motor structure. Each gyratory motor as shown in Figs. 4, 5 and 6 comprises a rotary part which includes a motor rotor 1 fixed to a sturdy tubular shaft 2 rotating within a stationary motor stator 3. The motor shaft 2 is supported by a pair of self-lubricating, self-aligning and gyratory bearings 4 mounted within the stationary framework 5 of the stator structure in a manner to permit gyratory movement of the motor shaft with minimum wear on the moving parts. The motor rotor 1, motor stator 3, motor bearings 4, and framework 5 are protected and contained within a motor casing 6 which may be formed as two cup-shaped half sections which can be readily telescoped over the motor framework 5 to facilitate assembly and repair of the motor. An air circulating fan 7 is fixed to each of the projecting ends of the tubular motor shaft 2 as shown in Fig. 6, and an unbalancing weight is also fixed to each projecting end of the motor shaft 2 which causes the motor casing 6 to execute a gyratory motion during operation of the motor. Each unbalancing weight may comprise a stud screw 8 which is threaded and secured to the hub of the fan 7, each stud carrying one or more counter weight discs 8' at the end thereof, which may be weighted in conformity with the intensity of the gyratory action desired.

The motor casing 6 is supported within an outer tubular casing 10 by means of a pair of resilient rubber rings 9 positioned therebetween, as shown in Figs. 5 and 6, and which provide the sole support for the gyratory motor. The ends of the tubular casing 10 enclose the air circulating fans 7 and are closed by suitable closure discs 10' having air circulation holes 10" therein. A current supply cord 11 as shown in Fig. 4 extends through the tubular casing 10 and is connected to the motor to supply operating current thereto, the other end of the current supply cord 11 being connected to a conveniently located motor cut-off time switch and rheostat for controlling the speed and running period of the variable speed motor.

The massage action generated by the motor assembly $m$ is delivered with maximum effectiveness to the body supporting surface of an upholstered cushion by the motion transmitting assembly of this invention. The cushion itself essentially comprises a framework which embraces two spaced frame members $n$ as shown in Figs. 3, 4, 8, 9, 11, 14 and 18, designed to support a series of highly resilient steel wire springs $s$ which are sinusoidal or zigzag in form, and which extend substantially parallel to each other in upwardly arched relation, and which together form a resilient and upwardly arching supporting surface. Each end of each sinusoidal shaped steel wire spring $s$ is secured as by means of a suitable clip 12, as shown in Figs. 5A and 11, to the adjacent frame member $n$ of the cushion frame so that each sinusoidal spring is fixedly maintained in upwardly arching position. The sinusoidal springs $s$ which together form the arched supporting surface may vary in length in appropriate degrees so that the spring series will provide a supporting surface of the desired contour.

The spring series $s$ is covered by a coarse and rough fabric material $q$ such as burlap which is drawn relatively taut and tacked to the frame members $n$ to provide a continuous arched surface. A layer of contour wadding $q'$ formed of cotton or like fibres, which may average only one-half inch in thickness, is spread over the coarse fabric q and is distributed to give the surface of the cushion the desired contour and shape. A highly resilient rubber pad r, preferably formed in one piece, is then laid over the contour wadding q' as shown in Figs. 4, 8, 11 and 13, the resilient rubber pad r having a thickness of 1" to 3", and preferably a thickness of approximately 1½" to 2". This highly resilient pad r is preferably formed from a foam rubber composition such as foam rubber latex or a foamed synthetic rubber composition, which will compress under pressure to approximately one-fourth of its original thickness, and which will immediately return to its original thickness when the pressure exerted thereon is removed. This highly resilient rubber pad r also preferably has sunken pockets r' on the underside thereof as shown in Fig. 4, which serve to increase the resiliency of the pad and insure positive contact grip between the resilient pad r, the underlying contour wadding q, and the overlying upholstery covering p. The coarse fabric covering q also firmly grips the arched surface forming faces of the sinusoidal springs s, so that gyratory motion delivered to the sinusoidal springs s by the gyratory motor assembly m is transmitted to a maximum degree to the upper surface of the upholstery covering p.

The upholstery covering p which provides the body supporting surface of the cushion may comprise a selected upholstery textile fabric or sheeting of limited stretch characteristics. The upholstery covering p is snugly drawn over the resilient pad r so as to maintain the pad under slight compression and in motion gripping engagement therewith, the free edges of the upholstery covering being suitably secured as by tacking to the cushion framework. When the cushion is thus constructed, the body supporting surface of the upholstery covering delivers the maximum degree of massage action to the parts of the human body in contact therewith, and describes a path of motion which is generally elliptical in form, with the major stroke axis extending longitudinally of the cushion, and the minor stroke axis extending vertically of the cushion surface. The longitudinal stroke thus produced is in the order of one-half mm. to one and one-half mm. in longitudinal length, and the vertical stroke is in the order of one-tenth mm. to one-fourth mm. in height, under loaded use conditions. This highly effective massage action is insured by the particular construction and materials used in forming the cushion, and the means employed to transmit the motion generated by the gyratory motor assembly m to the sinusoidal springs s.

The motion transmitting means preferably comprises two bands t as shown in Figs. 3, 9, 11 and 18, which extend transversely of the series of sinusoidal springs s of the cushion. Each band t is preferably made of metal such as spring steel, having substantially no elongation characteristic, but which is sufficiently thin to have a certain degree of flexure. Each band t extends transversely across the approximate midsection of the sinusoidal springs, and is rigidly secured to each spring traversed thereby as by means of a clamp bolt 13 and washers 13' as shown in Figs. 3 and 5. A metal band loop o is tightly clamped around the cylindrical motor casing 6, and is rigidly secured to the transmission band t and the sinusoidal spring s which the motor assembly underlies as by a clamp bolt 13. One end of the band loop o is fixed to a clamping device 14, and the other end of the band loop extends through the clamping device 14, the clamping device having adjusting means 14' whereby one end of the band may be manipulated to draw the band in tightly clamped relation around the motor housing 6. The adjustable band loops o provide convenient means for detachably clamping the motor assembly m to each of the motion transmitting bands t and to the sinusoidal springs under which the motor assembly is positioned.

The variable speed motor preferably has a variable speed range of approximately 1800 to 3000 r.p.m. For soothing and relaxing massage action, the motor is preferably operated at a speed of approximately 2000 to 2400 r.p.m. During operation, the motor casing and the clamping bands o thereto attached prescribe a path of motion which is substantially circular. This motion is transmitted through the transmission bands t to the sinusoidal springs s, and thence to the rough textile covering q, contour wadding q', highly resilient padding r and upholstery covering p. During this transmission, the path of motion executed by the motor assembly m is desirably flattened into elliptical shape, with the vertical stroke component modulated or reduced in length as compared to the longitudinal stroke component. The motion generating and transmitting system achieved by the combination of elements above described, results in the production of a longitudinal stroke component extending lengthwise of the occupant's body reposing on the cushion surface, which is substantially of the same order of magnitude as the longitudinal stroke component generated by the gyratory motor assembly m, but with the more agitative vertical stroke component substantially reduced. A massage action on the contacting body is thus produced which simulates hand massage action, but the speed of the massage strokes is increased manifold times, is much more effective than hand massage, and is substantially more soothing and relaxing.

Upholstered cushions which incorporate the motion generating and transmitting system of this invention may be used to form the cushion sections of various types and kinds of upholstered furniture. By way of example, there is shown in Fig. 1 an upholstered chaise lounge whose frame structure comprises a pair of generally parallel side frame members 21 which are connected at the foot end thereof by an end frame member 22 as by corner blocks 22'. The side frame members 21 are contoured to provide the frame sections 21' for the seat cushion A, upwardly extending and rearwardly inclined frame sections 21" for the backrest cushion B, and frame extensions 21''' for the headrest cushion C, said sections together providing the framework for a chaise lounge of desired contour. The framework is supported by a pair of front legs 23 fixed to a transverse frame member 24, and a pair of inclined rear legs 23' fixed to a second transverse frame member 24', the ends of the transverse frame members 24 and 24' being secured to the side frame members 21 as shown in Figs. 2 and 3.

The end extensions 21''' of the backrest framing sections 21" are joined by a transverse platform member 25 which provides a base support for a plurality of rows of coil cushioning springs 26. The coil springs 26 are enclosed within a fabric covering 27 such as burlap which supports a cotton or fibrous padding 28 of low vibration transmittibility which may also be covered by a relatively thin layer of sponge rubber to give the headrest cushion the desired softness. This padding is enclosed within upholstery covering 29 formed of suitable upholstery material. The free edges of the fabric undercovering 27 and upholstery covering 29 may be secured as by tacking the same to the headrest platform 25 in a manner to compress the coil springs 26 and padding 28 and provide the desired contour for the headrest cushion.

The side frame sections 21' provide the frame members n for the seat cushion A, and to which its series of transversely extending sinusoidal springs s are secured, the surface forming area of these springs being covered by the coarse fabric covering q, contour wadding q', the resilient cushioning pad r, and the upholstering covering p as described, the marginal edges of the upholstery covering p being secured to the side frame sections 21', the end frame member 22, and the transverse frame member 24' as shown in Fig. 2. Similarly, the side frame sections 21" provide the frame members n for the backrest cushion B to which its transversely extending sinusoidal springs s are secured, the top side of this set of sinusoidal springs also being enclosed within the coarse fabric covering q, contour wadding q', the resilient rubber padding r and the upholstering covering p whose marginal edges are secured to the side frame sections 21″, the transverse frame member 24′, and the adjacent edge of the transverse platform 25 of the headrest section.

The paired motion transmitting bands t may extend transversely across both sets of sinusoidal springs s which form a part of the seat cushion A and backrest cushion B, with two gyratory motor assemblies m fixed thereto by the hoop loops o at the approximate midsection of the seat section and backrest section, as shown in Figs. 2 and 3.

It will be noted that coil springs 28 used to provide resiliency for the headrest section c, are completely independent of the motion generating and transmission system incorporated in the seat section A and backrest section B, with the result that the head of the occupant of the chaise lounge, resting against the head section C, is not subjected to disturbing vibration while the occupant's seat, legs and back are subjected to massage action.

The chaise lounge may also be equipped with a hip roll 15 having a core 15′ of cotton fibre or the like, encased within a highly resilient pad 15″ of foam rubber latex or the like, which is contained within a loop of suitable upholstery covering 16 secured as by tacking to the adjacent transverse frame member 24′. The hip roll 15 is also subjected to gyratory motion since it firmly seats against the adjacent vibratory upholstery covering p of the seat section A and backrest section B.

As illustrative of a further application of the massage cushion of this invention, there is shown in Fig. 7 a sofa-bed whose massage cushion forms the seat or bed section D thereof. This massage sofa-bed has a vertically extending backrest section E with the seat section D designed to be drawn out to convert the sofa into a daybed. This sofa comprises a supporting base 30 which includes a rectangular framework formed by a front frame member 31 and a rear frame member 32 connected by end frame members 33, this base framework being supported in raised elevation by two pairs of legs 34 fixed to a pair of transverse frame members 35 secured to the front and rear frame members 31 and 32 of the supporting base. The backrest section E may comprise a vertically extending backrest panel 36 as shown in Fig. 11 secured as by vertical struts 36′ to the rear frame member 32 of the base and which provides support for a plurality of rows of coil cushioning springs 37 maintained in contoured relation by a covering sheet 37′ of burlap or the like tacked to the framing panel 36. The sheet covering 37′ is in turn enclosed within a resilient cushioning pad 38 which is in turn covered and finished by upholstery covering 39 formed of any desired upholstery material, whose free edges are tacked and secured to the framing panel 36.

The seat cushion D comprises a seating frame 40 dimensioned to conform to the rectangular framework of the supporting base 30. The seating frame 40 comprises a front frame member 41, a rear frame member 42, and end frame members 43 of substantially uniform height and design to align with the corresponding front frame member 31, rear frame member 32 and end frame members 33 of the supporting base when the seat cushion is in retracted seating position as shown in Fig. 7. It will be noted that the front frame member 41, rear frame member 42, and end frame members 43 of the seat cushion D are substantially the same height, but that the top edge 32′ of the rear frame member 32 of the supporting base 30 is at a lower elevation than the top edge 31′ of the front frame member 31, and that the top edges 33′ of the end frame members 33 are correspondingly inclined so that the seat frame 40 of the seat cushion may be rearwardly inclined when in retracted seating position as shown in dotted lines in Fig. 10.

Manipulating mechanism 44 is provided by means of which the seating cushion D may be drawn forwardly to provide a daybed, with the front edge thereof overhanging the front frame member 31 of the supporting base, and further manipulated to place the body supporting surface of the seat cushion D in horizontal bed forming position as shown in full lines in Fig. 10. This mechanism may comprise a pair of rear supporting blocks 45 secured to the inside face of the end frame members 43 of the seat frame adjacent the rear end thereof as shown in Figs. 8 and 10. An angle shaped rear supporting leg 46 is secured to each rear supporting block 45, and a pair of spaced guide pins or rollers 46′ are secured to the downwardly extending arm of the supporting leg 46. An angular shaped guide track member 47 is secured to the adjacent inside face of the end frame member 33 of the supporting base 30, and presents an inclined guide rail 47′ whose upper and lower faces provide trackways for the guide pins or rollers 46′. Thus, when the seat cushion D is drawn forwardly as shown in full line in Fig. 10, the guide pins or rollers 46′ travel along the upwardly inclined guide rail 47′ of the track member 47 so as to raise the rear edge of the seat section A to a substantially horizontal bed forming position. When the seat cushion D is pushed rearwardly it is returned to inclined position, placing the rear edge of the seat cushion beneath the lower end of the backrest section E as shown in dotted lines in Fig. 10.

The forward end of the seat cushion is supported and manipulated by a pair of linkage devices, each comprising a front hinge bracket 48 fixed to the front lower edge of each end frame member 43 of the seat cushion D, each front hinge bracket 48 being connected as by hinge pivot 48′ to one end of a connecting link or strut 49 whose other end is pivoted to a hinge stud 49′ extending from a hinge plate 49″ fixed to the adjacent inside face of the end frame member 33 of the supporting base 30. The front end of the seat section D thus executes a semi-circular swinging movement when drawn out or retracted, and cooperates with the inclined guide rail 47′ and associated guide pins or rollers 46′ to support the seat cushion in horizontal position when drawn out, and in rearwardly inclined position when retracted.

The seat cushion D of the convertible sofa-bed above described is equipped with the motion generating and transmitting system of this invention, whereby the occupant's body, seated or stretched out on the upholstered covering p thereof, is subjected to soothing and relaxing massage action. The front and rear frame members 41 and 42 of the seat cushion provide the frame members n to which the transversely extending sinusoidal springs s are secured, the surface forming area of these springs being covered by the coarse fabric covering q, contour wadding q′, the resilient cushion pad r, and the upholstery covering p as above described, the marginal edges of the upholstery covering being tacked to the front and rear frame members 41 and 42 and the end frame members 43. The paired motion transmitting bands t extend transversely across and are secured to the series of sinusoidal springs s, with two gyratory motor assemblies m fixed thereto by the hoop straps o as heretofore described and as shown in Figs. 8, 9 and 11.

As a further illustration of the application of the massage cushions of this invention, Fig. 12 shows a reclining chair having the massage motion generating and transmission system incorporated into the cushioned seat section F, cushioned legrest section G, and cushioned backrest section H thereof. This chair is equipped with mechanism k for manipulating the seat section F, the legrest section G, the backrest section H, from seating position to various reclining positions by body pressure exerted against the backrest section H by the seated occupant. This mechanism k also includes means for automatically restoring the cushioned sections to seating position when the occupant's body pressure is removed from the backrest section. This chair as shown in Figs. 13 and 14 is mounted on a supporting base 50 comprising a pair of side frame members 51 fixedly secured together by a rear transverse member 52, and a pair of intermediate transverse members 53—53' positioned to not interfere with the operation of the reclining mechanism k. The supporting legs 54 are secured to the side frame members 51 of the supporting base 50 to support the cushioned seat section F at a convenient elevation.

Arm rest sections J may be formed as an integral part of the supporting base 50. Each arm rest section includes an arm rest frame presenting an upwardly extending rear frame member 55 whose lower end is secured to the rear end of the adjacent side frame member 51 of the supporting base and thence projects upwardly in rearwardly inclined position to the desired arm chair height. A top frame member 56 of desired contour is secured to the rear frame member 55 and a front frame member 57 whose lower end may be secured to the front end of the adjacent side frame member 51. The front frame member 57 may be shaped to give the front edge of the arm rest section a contour as shown in Fig. 12. The armrest frame is covered with upholstery padding and upholstery covering 58, and one of the armrest sections may have a motor control box 59 inset therein and closed by a downswinging cover as shown in Fig. 12 which provides ready access to the motor control instruments by the chair occupant.

The backrest section H comprises a backrest frame formed by a pair of side frame members 60 having a contoured front edge 60' and joined at the lower end thereof by a transverse frame member 61 and at the upper end thereof by a transverse frame member 62 whose ends project a distance beyond the side frame members 61 as shown in Fig. 14.

The headrest section I is formed by a headrest frame presenting side frame members 63 which are secured to the projecting ends of the upper transverse member 62 of the backrest frame. The side frame members 63 of the headrest frame present side extensions 63' which project downwardly below the upper transverse member 61 as shown in Fig. 14 to a position adjacent the top frame members 56 of the armrest sections J, the lower ends of the side extensions 63' being connected to the adjacent side frame members 60 of the backrest frame by lateral bracing blocks 64. The side frame members 63 of the headrest frame are connected by a pair of transverse platform panels 65 as shown in Figs. 13 and 14, which provide support for a plurality of rows of coil cushioning springs 66, which provide a cushioning medium for the headrest section. The coil springs 66 are enclosed within and maintained in contour relationship by a fabric covering 66' such as burlap. The covering 66' is in turn covered by upholstery padding 67 of cotton fibres or the like of low vibration transmittibility and a thin layer of sponge rubber for softness, the padding being enclosed within upholstery covering 68 tacked to the transverse platform panels 65 of the headrest section and the upper transverse member 61 of the backrest section.

The cushioned seat section F presents a seat frame which is independent of the backrest frame, and positioned between the armrest sections J, the seat frame being formed by side frame members 70 secured to a rear frame member 71 and a front frame member 72. The legrest section G also comprises a generally rectangular frame which is independent of the seat frame, and is formed by side frame members 73 joined to an inner end frame member 74 and an outer end frame member 75.

The cushioned seat section F, backrest section H, and legrest section G, are operatively connected by reclining mechanism k, by means of which all three sections may be manipulated into any desired reclining position by pressure exerted by the seat occupant against the backrest section, and which sections will automatically return to normal seating position when the seat occupant leans forward in a manner to remove body weight from the backrest section.

The reclining mechanism k comprises a pair of angular supporting bars 80, each bar presenting a longer lower section, secured in inclined position to the adjacent inside face of the base side frame member 51 as shown in Fig. 13, by a pair of securing bolts or screws 81, and a shorter upturned section extending above the top edge of the base side frame member 51. The backrest section H is swingably supported by a pair of angular lever bars 82 each presenting a short lower arm section and a rearwardly inclined and outwardly offset upper arm section which extends above the top edge of the adjacent base side frame member 51. The upper arm section is designed to telescope into a pocket forming bracket 83 fixed to the outside face of the adjacent side frame member 60 of the backrest section, and may be retained in pocketed position by set screws. The lower ends of the paired angular lever bars 82 are pivoted as by aligned pivot studs 84 to the lower ends of the adjacent inclined supporting bars 80, and about which the backrest section H may pivot. Rearward inclination of the backrest section H is limited by a pair of link bars 85, each having the lower end thereof secured as by a pivot stud 85' to the fixed supporting bar 80, the other end of the link bar 85 having a limit slot 86 through which a limit stud 86' fixed to the angular lever bar 82 extends.

The elbow portion of each angular lever bar 82 is pivotally connected to the seat frame as by a pivot stud 87' projecting from a bracket 87 secured to the lower edge of the adjacent seat side frame. As thus assembled, it will be noted that rearward swinging movement of the backrest section H will swing the paired angular lever bars 82 rearwardly in a manner to also draw the seat frame rearwardly and simultaneously elevate the rear edge of the seat frame so as to place the body supporting surface of the seat cushion more nearly in horizontal position.

The front end of the seat frame is supported by a pair of angular lever arms 88 whose elbow portions are pivotally connected to the upper ends of the adjacent inclined supporting bars 80 by axially aligned pivot studs 89. The upper end of the relatively short upper section of each lever arm 88 is connected by pivot stud 90' to a front seat bracket 90 secured to the lower edge of the adjacent seat frame member 70. Thus, when the angular lever bars 82 supporting the rear end of the seat, are swung rearwardly on their pivot studs 84 as by rearward swinging movement of the backrest section H, the seat frame is drawn rearwardly, thereby causing the short upper sections of the angular lever arms 88 to assume a rearward inclination with respect to the aligned pivot studs 89, and which in turn causes the longer lower sections of the angular lever arms 88 to swing forwardly from their approximate vertical position shown in Fig. 13. This swinging movement of the lower sections of the angular lever arms 88 as propelled by movement of the seat frame, is employed to manipulate the legrest section G to and from substantially vertical and horizontal positions.

A pair of main toggle links connected to the lower ends of the paired angular lever arms 88 are employed to manipulate the legrest section to and from the non-use position shown in full lines in Fig. 13 and extended position shown in dotted lines in Fig. 13. Each main toggle link comprises a main toggle lever 91 pivotally connected as by a pivot stud 91' to the lower end of the adjacent angular lever arm 88, the upper end of the toggle lever 91 being pivotally connected by pivot stud 92' to the midsection of legrest bracket 92 fixed to the lower edge of the adjacent side frame member 73 of the legrest section G. A pair of secondary toggle links each comprising a toggle lever 93, is connected to the inner end of the adjacent legrest bracket 92 as by pivot stud 92″. Each toggle lever 93 is also pivotally connected by an intermediate pivot stud 93′ to the lower section of the angular lever arm 88 at an intermediate point above the lower end thereof. The extreme lower end of each secondary toggle lever 93 is pivoted as by pivot stud 93″ to the lower end of a companion toggle lever 94. The upper end of the companion toggle lever 94 is pivotally connected as by pivot stud 94′ to the elbow portion of the adjacent fixed supporting bar 80. Swinging movement of the lower sections of the paired angular lever arms 88 as induced by the rearward and forward movement of the seat frame, operates to manipulate the two pairs of toggle links and the legrest section supported thereby to and from retracted position and extended position.

The backrest section H, legrest section G, and seat section F are normally retained in seating position by means of a pair of tension springs 95 as shown in Fig. 13. One end of each tension spring 95 is secured to a lug portion 87″ extending from the adjacent rear seat bracket 87. The other end of each tension spring 95 is connected as by means of an adjustable linkage 96 to the pivot stud 89 projecting from the upper end of the fixed support bar 80. When the backrest section H is in seating position, the tension springs 95 are contracted, but when the backrest section is swung rearwardly the tension springs 95 are stretched by the corresponding rearward movement of the seat frame to which the tension springs 95 are attached as by seat lug portions 87″, the studs 89 to which the other ends of the tension springs 95 are connected remaining fixed at all times. Thus, the tension springs 95 operate to urge the seat section F, legrest section G, and backrest section H from reclining position to seating position when body pressure against the backrest section is removed. When the seated chair occupant desires to occupy a reclining position, he merely exerts back pressure against the backrest section H, which causes the backrest section to tilt rearwardly against the action of the tension springs 95, which causes the seat section F to move rearwardly and elevate into a more nearly horizontal position, and which movement in turn causes the legrest section G to swing forwardly into leg supporting position. The maximum inclination of the backrest section is limited by the limit links 85. The reclining mechanism $k$ as above described is contained and concealed within the box shaped supporting base 50.

The cushioned seat section F, legrest section G, and backrest section H of the reclining chair above described, are each equipped with a separate motion generating and transmitting system whereby the body parts of the chair occupant in contact with the cushioned surfaces thereof are subjected to soothing and relaxing massage action. In the form of the invention shown in Figs. 13 and 14, the series of sinusoidal springs $s$ associated with the cushioned backrest section H, extend longitudinally of the cushion with the upper and lower transverse members 61 and 62 serving as the frame members $n$ to which the ends of the upwardly arched springs $s$ are secured. In this form of the invention the axis of the gyratory motor assembly $m$ extends at right angles to the longitudinal length of the sinusoidal springs, with the motor assembly rigidly secured to the three overlying sinusoidal springs $s$ by three motor attaching hoops $o$ as shown in Figs. 14, 15 and 16. The remaining sinusoidal springs which do not extend over the motor assembly are connected into the motion system by laterally extending bands $t'$ secured to these sinusoidal springs $s$ by clamp bolts 13, the other end of each band $t'$ being rigidly secured to the next adjacent motor attaching hoop $o$ as by spot welds 13″ as shown in Fig. 17.

As thus mounted, the gyratory motor assembly $m$ operates to deliver the major motion stroke in a direction lengthwise of the sinusoidal springs $s$, the springs having substantial longitudinal vibration capability because they are upwardly arched. The sinusoidal springs $s$ for the backrest cushion are contained within the covering fabric $q$ covered by contour wadding $q'$, which is in turn covered by the resilient rubber padding $r$ and the upholstery covering $p$, whose marginal edges are secured to the side frame members 60 and transverse frame members 61 and 62 of the backrest cushion frame. It will be noted that the coil springs 66 which provide the resiliency for the headrest section I are completely independent of the motion generating and transmission system incorporated into the cushioned backrest section H so that the head of the chair occupant is not subjected to disturbing vibration during massage treatment of the occupant's back.

In the form of the invention shown in Figs. 13 and 14, the cushioned seat section F is also provided with a series of upwardly arched sinusoidal springs extending longitudinally of the cushion, the transverse frame members 71 and 72 serving as the frame members $n$ to which the ends of the longitudinally extending sinusoidal springs $s$ are attached. To provide support and resiliency for the built-up front upper edge of the seat cushion H, a series of angular shaped sinusoidal springs $s'$ are provided which extend longitudinally of the cushion as shown in Fig. 13, one leg of each angular sinusoidal spring $s'$ being secured to the adjacent transverse frame member 72 and adjacent portion of the underlying main sinusoidal spring $s$, with the other leg of each angular spring $s'$ flaring upwardly. A framing wire 17 is provided to maintain the upwardly flared spring legs of the angular springs $s'$ in proper assembled relation. The main sinusoidal springs $s$ and the angular sinusoidal springs $s'$ of the seat cushion are enclosed within the fabric covering $q$ covered by contour padding $q'$, on which the highly resilient rubber cushioning pad $r$ is supported and enclosed within the upholstery covering $p$, which may be tacked to the side frame members 70 and transverse frame members 71 and 72 of the seat frame. A gyratory motor assembly $m$ whose axis extends at right angles to the main sinusoidal springs $s$ is connected to these springs by the three loop straps $o$ and the laterally extending bands $t'$ as shown in Fig. 14.

The cushioned legrest section G of the invention shown in Figs. 13 and 14 is also equipped with a longitudinally extending and upwardly arching series of a sinusoidal springs whose ends are secured to the end frame members 74 and 75 which serve as the frame members $n$ for this cushion. These sinusoidal springs $s$ are also enclosed within a fabric covering $q$ and contour wadding $q'$ which provides support for the overlying highly resilient rubber padding $r$, which is in turn covered by the upholstery covering $p$ whose margins are secured to the frame members 73, 74 and 75 of the legrest frame. The sinusoidal springs $s$ of the legrest cushion are vibrated by a gyratory motor assembly $m$ whose axis extends at right angles to the springs $s$ and which is secured thereto by the band loops $o$ and laterally extending bands $t'$.

As thus constructed, the upholstery coverings $p$ of the backrest section H, seat section F and legrest section G are gyrated with an elliptical path of movement whose major stroke extends longitudinally of these cushions and the occupant's body reclining thereagainst, and whose minor stroke is in a direction vertical to the upholstery covering and the occupant's body reclining thereagainst.

In the form of the invention shown in Fig. 18, the main series of sinusoidal springs $s$ extends transversely of the cushioned backrest section H, seat section F and legrest section G. In this construction the side frame members 60 of the backrest section H provide the frame members $n$ to which its series of transversely extending and upwardly arching sinusoidal springs $s$ are secured. This series of springs is in turn covered by a fabric covering $q$ and contour wadding $q'$ which supports the overlying highly resilient padding $r$, which is in turn enclosed within the upholstery covering p tacked to the framing members 60, 61 and 62 of the backrest frame. This transversely extending series of sinusoidal springs are connected to a pair of longitudinally extending motion transmitting bands t which in turn are secured to the gyratory motor assembly m by the adjustable hoop straps o. It will be noted that the coil springs 66 which cushion the headrest section I are independent of the motion transmitting system of the backrest section, so that the head of the chair occupant is not subjected to disturbing vibration when his back is subjected to massage treatment.

The cushioned seat section of the modification shown in Fig. 18 also employs a series of upwardly arching main sinusoidal springs s which extend in a transverse direction and whose ends are secured to the side frame members 70 of the seat frame which serve as the frame members n for this cushion. The upper front edge of this seat cushion is reinforced by angular shaped sinusoidal springs s', which extend longitudinally of the cushion, and whose lower leg is secured to and supported by the adjacent transverse frame member 72 and an auxiliary frame member 72'. The upwardly flaring legs of the angular sinusoidal springs s' are connected to a framing wire 17 which maintains the upwardly flared spring legs in assembled relationship. These main sinusoidal springs s and angular sinusoidal springs s' are enclosed within a covering fabric q and contour wadding q' which supports the highly resilient rubber cushion pad r and which is in turn enclosed within the upholstery covering p whose marginal edges are secured to the framing members 70, 71 and 72 of the seat frame. Massage motion is transmitted to the upholstery covering of this seat cushion by a gyratory motor assembly m whose axis extends parallel to the main sinusoidal springs s and connected thereto by the longitudinally extending bands t and hoop loops o.

The legrest cushion G of the invention shown in Fig. 18 is also equipped with an upwardly arching series of sinusoidal springs s which extend transversely of the cushion and whose ends are secured to the side frame members 73 thereof which serve as the spring supporting members n of this cushion. These springs are enclosed within the fabric covering q and contour wadding q' which in turn supports the resilient rubber cushioning pad r enclosed within the upholstery covering p, whose margins are secured to the frame members 73, 74 and 75 of the legrest cushion frame. These sinusoidal springs are vibrated by a gyratory motor assembly m which is connected to the springs s by means of the paired longitudinally extending bands t and hoop loops o.

The separate gyratory motor assemblies m associated with the massaging backrest cushion H, seat cushion F and legrest cushion G, of the invention shown in Fig. 18, delivers to the upholstery coverings p thereof a massage motion whose path of movement is generally elliptical in form, with the major motion stroke extending longitudinally of these cushions and the occupant's body, and with the minor stroke extending vertical to the occupant's body. The massage action produced is deep and penetrating and yet soothing and relaxing to the person under treatment, since the vertical component of movement is modulated by the substantially longer longitudinal component.

The motion generating and transmitting systems of this invention may be built into various shapes and forms of upholstered cushions designed for incorporation into various types of upholstered furniture of attractive appearance for home and office use. The motion generating motor assemblies m may be activated and speed controlled by conveniently mounted switches and rheostats to deliver to the occupant's body as desired, effortless massage action which is soothing and relaxing, yet sufficiently penetrating to stimulate circulation, ameliorate muscle soreness, relieve nervous tension, and induce restful sleep.

While certain novel features of this invention have been disclosed herein and are pointed out in the claims, it will be understood that various omissions, substitutions, and changes may be made by those skilled in the art without departing from the spirit of this invention.

What is claimed is:

1. A body massaging structure including, a cushioned frame presenting a pair of spaced frame members, a plurality of spaced and upwardly arching wire springs each of sinusoidal form in plan whose opposite ends are secured to said spaced frame members, said springs together presenting a yieldable and upwardly arching supporting surface, upholstery padding including a coarse fabric covering extending over the arched supporting surface of said springs, a relatively thin layer of contour wadding extending over said fabric covering, and a relatively thick pad formed of a highly resilient rubber-like composition such as foamed rubber latex and foamed synthetic rubber composition supported on said contour wadding, upholstery covering of limited stretch characteristics connected to said spaced frame members and snugly embracing said resilient pad, a gyratory motion generating motor contained within an enclosing housing, a pair of loop straps in surrounding relation to the motor containing housing, each of said loop straps incorporating clamp means for adjusting the diameter of the loop strap into snug embracing relation around the housing, means for rigidly connecting each loop strap to the underside of the adjacent sinusoidal spring, and motion transmitting bands connecting all of said sinusoidal springs whereby motion generated by said gyratory motor is transmitted through said housing, loop straps, motion transmitting bands, sinusoidal springs, fabric covering, contour wadding and resilient pad to the supporting surface of said upholstery covering.

2. A body massaging structure including, a cushioned frame presenting a pair of spaced frame members, a plurality of spaced and upwardly arching wire springs each of sinusoidal form in plan whose opposite ends are secured to said spaced frame members, said springs together presenting a yieldable and upwardly arching supporting surface, upholstery padding extending over and supported by the arched supporting surface of said springs, said padding including a resilient pad having a thickness in the order of one inch to three inches and formed of a highly resilient rubber-like composition such as foamed rubber latex and foamed synthetic rubber composition, an upholstery covering of limited stretch characteristics snugly embracing said resilient pad and connected to said frame members, a pair of motion transmitting bands secured to and extending transversely across the underside of the respective sinusoidal springs along the approximate midsection thereof, a gyratory motion generating motor having the axis thereof extending substantially parallel to the longitudinal axis of the sinusoidal springs, an enclosing housing containing said gyratory motor, a pair of loop straps in surrounding relation to the motor containing housing, each of said loop straps incorporating clamp means for adjusting the diameter of the loop strap into snug embracing relation around the housing, and means for rigidly connecting said loop straps to the underside of the paired motion transmitting bands.

3. A body massaging structure including, a cushioned frame presenting a pair of spaced frame members, a plurality of spaced and upwardly arching wire springs each of sinusoidal form in plan whose opposite ends are secured to said spaced frame members, said springs together presenting a yieldable and upwardly arching supporting surface, upholstery padding including a fabric covering extending over the arched supporting surface of said springs, a relatively thin layer of contour wadding extending over said fabric covering, and a relatively thick pad formed of a highly resilient rubber-like composition such as foamed rubber latex and foamed synthetic rubber composition extending over said contour wadding, an upholstery covering of limited stretch characteristics snugly embracing said resilient pad and connected to said frame members, a gyratory motion generating motor assembly having the axis thereof extending transversely of the longitudinal axis of the sinusoidal springs, said motor assembly including a gyratory motor contained within an enclosing housing, a pair of loop straps in surrounding relation to the motor containing housing, each of said loop straps incorporating clamp means for adjusting the diameter of the loop strap into snug embracing relation around the housing, means for rigidly connecting said loop straps to the underside of those sinusoidal springs which directly overlie the motor assembly, and motion transmitting bands secured to and extending transversely across the underside of the remaining sinusoidal springs and connected to a sinusoidal spring secured to the motor assembly.

4. A body massaging structure including, a cushioned frame presenting a pair of spaced frame members, a plurality of spaced and upwardly arching wire springs each of sinusoidal form in plan whose opposite ends are secured to said spaced frame members, said springs together presenting a yieldable and upwardly arching supporting surface, upholstery padding extending over and supported by the arched supporting surface of said springs, said padding including a relatively thick cushioning pad formed of a highly resilient rubber-like composition such as foamed rubber latex and foamed synthetic rubber composition, an upholstery covering of limited stretch characteristics snugly embracing said resilient pad and connected to said frame members, a pair of motion transmitting bands secured to and extending transversely across the underside of the respective sinusoidal springs along the approximate midsection thereof, a gyratory motion generating motor assembly which includes a motor casing whose longitudinal axis extends substantially parallel to the longitudinal axis of the sinusoidal springs, a pair of loop straps in surrounding relation to the motor containing casing, each of said loop straps incorporating clamp means for adjusting the diameter of the loop strap into snug embracing relation around said casing, and means for rigidly connecting each loop strap to the underside of the adjacent motion transmitting band.

5. Upholstered massage furniture including in combination, a cushioned backrest section and a cushioned headrest section each presenting a pair of spaced frame members, a series of upwardly arching and substantially parallel extending wire springs each of sinusoidal form in plan whose opposite ends are secured to the spaced frame members of said cushioned backrest section, upholstery padding covering the upwardly arched surface of said sinusoidal springs which includes a relatively thick pad formed of highly resilient rubber-like composition such as foamed rubber latex and foamed synthetic rubber composition supported by said upwardly arching supporting surface, upholstery covering of limited stretch characteristics snugly embracing said resilient pad and connected to the spaced frame members of the backrest section, a gyratory motion generating assembly, and motion transmitting means operatively connecting said motor assembly to the underside of said sinusoidal springs whereby motion generated by said motor assembly is transmitted through said sinusoidal springs and resilient pad to the supporting surface of the upholstery covering, said cushioned headrest section presenting a platform member extending transversely between and secured to the frame members thereof, and a series of coiled cushioning springs supported by said platform member and covered by cushioning padding and upholstery covering of low vibration transmittibility, said cushioned headrest section having the transversely extending margins of its upholstery covering fixedly secured to the lower and upper transverse edges of said platform member, said cushioned headrest section being independent of the motion transmitting system associated with the backrest section.

6. Upholstered massage furniture including in combination, a cushioned backrest section, a cushioned headrest section and a cushioned seat section each presenting a pair of spaced frame members, two sets of upwardly arching and substantially parallel extending wire springs each of sinusoidal form in plan whose opposite ends are secured to the spaced frame members of said backrest section and said seat section respectively, upholstery padding covering the upwardly arching surface of each set of sinusoidal springs which includes, a coarse fabric covering extending over the arched supported surface of said sinusoidal springs, a relatively thin layer of contour wadding extending over said fabric covering, and a relatively thick pad formed of highly resilient rubber-like composition such as foamed rubber latex and foamed synthetic rubber composition supported by said contour wadding, upholstery covering of limited stretch characteristics connected to the spaced frame members of said backrest section and seat section respectively and snugly embracing said resilient pad and connected to the adjacent frame members thereof, a gyratory motion generating assembly for each set of sinusoidal springs, and motion transmitting means operatively connecting each motor assembly to the underside of each set of sinusoidal springs whereby the motions generated by said motor assemblies are transmitted through said sinusoidal springs, fabric covering, contour wadding and resilient pads to the supporting surfaces of the upholstery coverings, said cushioned headrest section presenting a platform member extending transversely between and secured to the frame members thereof, and a series of coiled cushioning springs supported by said platform member and covered by cushioning padding and upholstery covering of low vibration transmittibility, said cushioned headrest section having the transversely extending margins of its upholstery covering fixedly secured to the lower and upper transverse edges of said platform member, said cushioned headrest section being independent of the motion transmitting system associated with the backrest section and seat section.

7. An upholstered massage lounge presenting a cushioned seat section, an upwardly extending and rearwardly inclined backrest section and a headrest section, a pair of side frame members for the seat section, backrest section and headrest section, two sets of upwardly arching and substantially parallel extending wire springs each spring being of sinusoidal form in plan, said spring sets providing a yieldable and upwardly arching supporting surface for the seat section and backrest section respectively, each set of sinusoidal springs extending transversely between adjacent side frame members and secured thereto, upholstery padding covering each set of sinusoidal springs which includes a relatively thick pad formed of highly resilient rubber-like composition such as foamed rubber latex and foamed synthetic rubber composition, upholstery covering of limited stretch characteristics snugly embracing each of said resilient pads and connected to the adjacent side frame members, a gyratory motion generating assembly for each set of sinusoidal springs, motion transmitting means operatively connecting each motor assembly to the underside of the adjacent set of sinusoidal springs whereby the motions generated by said motor assemblies are transmitted through the sinusoidal springs and resilient pads to the supporting surfaces of the upholstery coverings of said cushioned seat section and backrest section respectively, said cushioned headrest section presenting a platform member extending between and secured to the adjacent side frame members, a series of coiled cushioning springs supported by said platform member and covered by cushioning padding and upholstery covering of low vibration transmittibility, said cushioned headrest section having the transversely extending margins of its upholstery covering fixedly secured to the lower and upper transverse edges of said platform member, said cushioned headrest section being independent of the motion transmitting system associated with the backrest section and seat section.

8. An upholstered massage lounge presenting a cushioned seat section and an upwardly extending and rearwardly inclined backrest section, a pair of side frame members for the seat section and backrest section which are connected by transverse frame members, two sets of upwardly arching and substantially parallel extending wire springs each spring being of sinusoidal form in plan, said spring sets providing a yieldable and upwardly arching supporting surface for the seat section and backrest section respectively, each set of sinusoidal springs extending transversely between adjacent side frame members and secured thereto, upholstery padding covering each set of sinusoidal springs which includes a relatively thick pad formed of highly resilient rubber-like composition such as foamed rubber latex and foamed synthetic rubber composition, upholstery covering of limited stretch characteristics snugly embracing each of said resilient pads and connected to the adjacent side frame members, a gyratory motion generating assembly for each set of sinusoidal springs, motion transmitting means operatively connecting each motor assembly to the underside of the adjacent set of sinusoidal springs whereby the motions generated by said motor assemblies are transmitted through the sinusoidal springs and resilient pads to the supporting surfaces of the upholstery coverings of said cushioned seat section and backrest section respectively, and a hip roll having an upholstery covering whose margins are secured to the adjacent transverse frame member and a highly resilient rubber-like composition contained within and supporting the upholstery covering thereof, said hip roll being drawn into motion receiving contact with the surfaces of the upholstery coverings of said cushioned seat section and backrest section.

9. An upholstered massage lounge presenting a cushioned seat section and an upwardly extending and rearwardly inclined backrest section, a pair of side frame members for the seat section and backrest section, two sets of upwardly arching and substantially parallel extending wire springs each spring being of sinusoidal form in plan, said spring sets providing yieldable and upwardly arching supporting surfaces for the seat section and backrest section respectively, each set of sinusoidal springs extending transversely between adjacent side frame members and secured thereto, upholstery padding covering each set of sinusoidal springs which includes a relatively thick pad formed of highly resilient rubber-like composition such as foamed rubber latex and foamed synthetic rubber composition, upholstery covering a limited stretch characteristics snugly embracing each of said resilient pads and connected to the adjacent side frame members, a pair of substantially parallel motion transmitting bands extending longitudinally of the lounge and across the underside of both sets of sinusoidal springs and rigidly secured to the springs traversed thereby, and two gyratory motor assemblies secured to said paired bands and located on the underside of the cushioned seat section and cushioned backrest section respectively, each of said gyratory motor assemblies including a gyratory motor supported within an enclosing housing, a pair of loop straps in surrounding relation to the motor containing housing, each of said loop straps having clamp means associated therewith for adjusting the diameter of the loop strap into snug embracing relation around the housing, and means for rigidly connecting each loop strap to the respective motion transmitting bands.

10. A body massaging sofa-bed presenting a base frame, a cushioned backrest section mounted on said base frame, and a cushioned seat section extending over and supported by said base frame, said cushioned seat section presenting a pair of spaced side frame members, upwardly arching and substantially parallel extending wire springs with each spring of sinusoidal form in plan, said springs extending between and secured to said side frame members, upholstery padding covering the upwardly arching surface of said sinusoidal springs including, a coarse fabric covering extending over the arched supporting surface of said sinusoidal springs, a relatively thin layer of contour wadding extending over said fabric covering, and a relatively thick pad formed of highly resilient rubber-like composition such as foamed rubber latex and foamed synthetic rubber composition supported by said contour wadding, upholstery covering of limited stretch characteristics connected to the spaced frame members of said seat section and snugly embracing said resilient pad, a pair of substantially parallel motion transmitting bands extending longitudinally of the seat section and across the underside of the sinusoidal springs thereof and rigidly secured to the springs traversed thereby, and a gyratory motor assembly secured to said paired bands whose motor axis is substantially parallel to the longitudinal length of said sinusoidal springs, said gyratory motor assembly including a gyratory motor supported within an enclosing housing, a pair of loop straps in surrounding relation to the motor containing housing, each of said loop straps having clamp means associated therewith for adjusting the diameter of the loop strap into snug embracing relation around the housing, and means for rigidly connecting each loop strap to the adjacent motion transmitting band.

11. A body massaging sofa-bed presenting a base frame, a cushioned backrest section mounted on said base frame, and a cushioned seat section extending over said base frame, said cushioned seat section presenting a pair of spaced side frame members, upwardly arching and substantially parallel extending wire springs with each spring of sinusoidal form in plan, said springs extending between and secured to said side frame members, upholstery padding covering the upwardly arching surface of said sinusoidal springs and including a relatively thick pad formed of highly resilient rubber-like composition such as foamed rubber latex and foamed synthetic rubber composition, upholstery covering of limited stretch characteristics connected to the spaced frame members of said seat section and snugly embracing said resilient pad, a pair of substantially parallel motion transmitting bands extending longitudinally of the seat section and across the underside of the sinusoidal springs thereof and rigidly secured to the springs traversed thereby, a gyratory motor assembly secured to said paired bands, and mechanism for manipulating said cushioned seat section from and to inclined seating position and extended bed-forming position, said mechanism including inclined trackways secured to the base frame, bracket legs fixed to and extending downwardly from the rear of the seat cushion frame and riding on said inclined trackways, and swingable struts pivotally connected to the front of the seat frame and the base frame.

12. A body massaging sofa-bed presenting a base frame, a cushioned backrest section mounted on said base frame, and a cushioned seat section extending over and supported by said base frame, said cushioned seat section presenting a pair of spaced side frame members, upwardly arching and substantially parallel extending wire springs with each spring of sinusoidal form in plan, said springs extending between and secured to said side frame members, upholstery padding covering the upwardly arching surface of said sinusoidal springs including a coarse fabric covering extending over the arched supporting surface of said sinusoidal springs, a relatively thin layer of contour wadding extending over said fabric covering, and a relatively thick pad formed of highly resilient rubber-like composition such as foamed rubber latex and foamed synthetic rubber composition supported by said contour wadding, upholstery covering of limited stretch characteristics connected to the spaced frame members of said seat section and snugly embracing said resilient pad, a pair of substantially parallel motion transmitting bands extending longitudinally of the seat section and across the underside of the sinusoidal springs thereof and rigidly secured to the springs traversed thereby, a plurality of spaced gyratory motor assemblies secured to said paired bands, and mechanism for manipulating said cushioned seat section from and to inclined seating position and extended bed-forming position, said mechanism including inclined trackways secured to the base frame, bracket legs fixed to and extending downwardly from the rear of the seat cushion frame and riding on said inclined trackways, and swingable struts pivotally connected to the front of the seat frame and the base frame.

13. A body massaging lounge chair including in combination, a base frame, a cushioned seat section and a cushioned backrest section supported by said base frame, each of said sections presenting a pair of spaced frame members, a separate set of upwardly arching and substantially parallel extending wire springs for each of said sections, each of said springs being of sinusoidal form in plan and having the ends thereof secured to the adjacent frame members, each set of sinusoidal springs presenting a yieldable and upwardly arching supporting surface, upholstery padding covering each of said upwardly arching supporting surfaces which includes a relatively thick pad formed of highly resilient rubber-like composition such as foamed rubber latex and foamed synthetic rubber composition, upholstery covering of limited stretch characteristics snugly embracing each resilient pad and connected to the adjacent frame members, a gyratory motion generating assembly for each set of sinusoidal springs positioned below the under surface thereof, motion transmitting means operatively connecting each motor assembly to the underside of its set of sinusoidal springs whereby the motions generated by said motor assemblies are transmitted through said sinusoidal springs and resilient pads to the supporting surfaces of the upholstery coverings of said seat section and backrest section respectively, a cushioned headrest section presenting a platform member, a series of coiled cushioning springs supported by said platform member and covered by cushioning padding and upholstery covering of low vibration transmittibility, said cushioned headrest section being independent of the motion transmitting system associated with the backrest section and seat section, and reclining mechanism operatively connecting the cushioned seat section and backrest section to said base frame whereby said cushioned backrest section may swing into reclining position with corresponding elevation of the cushioned seat section from rearwardly inclined seating position to a more horizontal position by back pressure exerted by the seated occupant against the cushioned backrest section.

14. A body massaging lounge chair including in combination, a base frame, a cushioned backrest section, a cushioned seat section and a cushioned legrest section supported by said base frame, each of said sections presenting a pair of spaced frame members, a separate set of upwardly arching and substantially parallel extending wire springs for each of said sections, each of said springs being of sinusoidal form in plan and having the ends thereof secured to the adjacent frame members, each set of sinusoidal springs presenting a yieldable and upwardly arching supporting surface, upholstery padding covering each of said upwardly arching supporting surfaces which includes a relatively thick pad formed of highly resilient rubber-like composition such as foamed rubber latex and foamed synthetic rubber composition, upholstery covering of limited stretch characteristics snugly embracing each resilient pad and connected to the adjacent frame members, a gyratory motion generating assembly for each set of sinusoidal springs positioned below the under surface thereof, motion transmitting means operatively connecting each motor assembly to the underside of its set of sinusoidal springs whereby the motions generated by said motor assemblies are transmitted through said sinusoidal springs, fabric covering, contour wadding and resilient pads to the supporting surfaces of the upholstery coverings of said backrest section, seat section and legrest section respectively, reclining mechanism operatively connecting the cushioned seat section and backrest section to said base frame whereby said cushioned backrest section may swing into reclining position with corresponding elevation of the cushioned seat section from rearwardly inclined seating position to a more horizontal position by back pressure exerted by the seated occupant against the cushioned backrest section, a series of toggle links connected to said cushioned legrest section and said reclining mechanism operative to swing said legrest section to and from substantially vertical position and horizontal position with the swinging movement of said backrest section to and from seating position and reclining position, and tension spring means for automatically restoring the seat section, backrest section and legrest section to seating position when back pressure applied against the backrest section is removed.

15. A body massaging lounge chair including in combination, a base frame, a cushioned backrest section, a cushioned seat section and a cushioned legrest section supported by said base frame, each of said sections presenting a pair of spaced frame members, a separate set of upwardly arching and substantially parallel extending wire springs for each of said sections, each of said springs being of sinusoidal form in plan and having the ends thereof secured to the adjacent frame members, each set of sinusoidal springs presenting a yieldable and upwardly arching supporting surface, upholstery padding covering each of said upwardly arching supporting surfaces, each upholstery padding including a coarse fabric covering extending over the arched supported surface as formed by its sinusoidal springs, a relatively thin layer of contour wadding extending over the fabric covering, and a relatively thick pad formed of highly resilient rubber-like composition such as foamed rubber latex and foamed synthetic rubber composition supported on the contour wadding, upholstery covering of limited stretch characteristics snugly embracing each resilient pad and connected to the adjacent frame members, a gyratory motion generating assembly for each set of sinusoidal springs positioned below the under surface thereof, motion transmitting means operatively connecting each motor assembly to the underside of its set of sinusoidal springs whereby the motions generated by said motor assemblies are transmitted through said sinusoidal springs, fabric covering, contour wadding and resilient pads to the supporting surfaces of the upholstery coverings of said backrest section, seat section and legrest section respectively, and a cushioned headrest section presenting a platform member, a series of coiled cushioning springs supported by said platform member and covered by cushioning padding and upholstery covering of low vibration transmittibility, said cushioned headrest section having the transversely extending margins of its upholstery covering fixedly secured to the lower and upper transverse edges of said platform member, said cushioned headrest section being independent of the motion transmitting system associated with the backrest section, seat section, and legrest section.

16. A body massaging lounge chair including in combination, a base frame, a cushioned backrest section, a cushioned seat section and a cushioned legrest section supported by said base frame, each of said sections presenting a pair of spaced frame members, a separate set of upwardly arching and substantially parallel extending wire springs for each of said sections, each of said springs being of sinusoidal form in plan and having the ends thereof secured to the adjacent frame members, each set of sinusoidal springs presenting a yieldable and upwardly arching supporting surface, upholstery padding covering each of said upwardly arching supporting surfaces which includes a relatively thick pad formed of highly resilient rubber-like composition such as foamed rubber latex and foamed synthetic rubber composition, upholstery covering of limited stretch characteristics snugly embracing each resilient pad and connected to the adjacent frame members, a gyratory motion generating assembly for each set of sinusoidal springs positioned below the under surface thereof, motion transmitting means operatively connecting each motor assembly to the underside of its set of sinusoidal springs whereby the motions generated by said motor assemblies are transmitted through said sinusoidal springs and resilient pads to the supporting surfaces of the upholstery coverings of said backrest section, seat section and legrest section respectively, reclining mechanism operatively connecting the cushioned seat section and backrest section to said base frame whereby said cushioned backrest section may swing into reclining position with corresponding elevation of the cushioned seat section from rearwardly inclined seating position to a more horizontal position by back pressure exerted by the seated occupant against the cushioned backrest section, a series of toggle links connected to said cushioned legrest section and said reclining mechanism operative to swing said legrest section to and from substantially vertical position and horizontal position with the swinging movement of said backrest section to and from seating position and reclining position, tension spring means for automatically restoring the seat section, backrest section and legrest section to seating position when back pressure applied against the backrest section is removed, and a cushioned headrest section presenting a platform member, a series of coiled cushioning springs supported by said platform member and covered by cushioning padding and upholstery covering of low vibration transmittibility, said cushioned headrest section being independent of the motion transmitting system associated with the backrest section, seat section and legrest section.

References Cited in the file of this patent
UNITED STATES PATENTS

| | | |
|---|---|---|
| 2,146,136 | Foote | Feb. 7, 1939 |
| 2,715,901 | Blake | Aug. 23, 1955 |
| 2,717,593 | Murphy | Sept. 13, 1955 |
| 2,783,479 | Bartolucci | Mar. 5, 1957 |
| 2,843,113 | Miller | July 15, 1958 |
| 2,894,505 | Manausa | July 14, 1959 |